(12) United States Patent
Ma

(10) Patent No.: US 9,961,735 B2
(45) Date of Patent: May 1, 2018

(54) LED CONSTANT-VOLTAGE DIMMING POWER SUPPLY AND DIMMING SYSTEM FOR LED LAMP HAVING SAME

(71) Applicant: Self Electronics Co., Ltd., Ningbo, Zhejiang (CN)

(72) Inventor: Xuhong Ma, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 167 days.

(21) Appl. No.: 15/192,644

(22) Filed: Jun. 24, 2016

(65) Prior Publication Data

US 2016/0381753 A1    Dec. 29, 2016

(51) Int. Cl.
*H05B 33/08* (2006.01)

(52) U.S. Cl.
CPC ..... *H05B 33/0845* (2013.01); *H05B 33/0815* (2013.01)

(58) Field of Classification Search
CPC .................. H05B 33/0845; H05B 33/0815
USPC ............... 315/294, 297, 307, 122, 192, 224
See application file for complete search history.

(56) References Cited

U.S. PATENT DOCUMENTS

| | | | | |
|---|---|---|---|---|
| 6,331,748 B1* | 12/2001 | Hong | ................... | H01L 41/044 310/318 |
| 6,400,095 B1* | 6/2002 | Primisser | ........... | H05B 41/2985 315/121 |
| 2012/0256553 A1* | 10/2012 | Chen | ................... | H05B 33/0845 315/205 |
| 2012/0286696 A1* | 11/2012 | Ghanem | ............ | H05B 33/0815 315/291 |
| 2013/0078733 A1* | 3/2013 | Holmes | ................. | B01L 3/0217 436/174 |
| 2013/0154507 A1* | 6/2013 | Gilliom | .............. | H05B 33/0815 315/297 |
| 2013/0154508 A1* | 6/2013 | Gilliom | ................. | H02M 3/158 315/297 |
| 2014/0170735 A1* | 6/2014 | Holmes | .................. | G01N 21/07 435/287.1 |
| 2014/0252972 A1* | 9/2014 | Cao | ..................... | H05B 33/0815 315/200 R |
| 2014/0361701 A1* | 12/2014 | Siessegger | ......... | H05B 33/0803 315/200 R |
| 2016/0360592 A1* | 12/2016 | Yang | ................... | H05B 37/0263 |

* cited by examiner

*Primary Examiner* — Douglas W Owens
*Assistant Examiner* — Syed M Kaiser
(74) *Attorney, Agent, or Firm* — Wang Law Firm, Inc.

(57) ABSTRACT

An LED constant-voltage dimming power supply being electrically connected to a dimmer and configured for changing duty ratio of output voltage thereof according to a controlling signal from the dimmer, includes a constant-voltage source, a damping discharge circuit module, a phase detecting circuit module, a duty ratio controlling module, and a switcher. The damping discharge circuit module is electrically connected to an input end of the constant-voltage source. The phase detecting circuit module is electrically connected to an output end of the constant-voltage source. The duty ratio controlling module is coupled to the phase detecting circuit. The switcher is electrically connected to the duty ratio controlling module. The LED constant-voltage dimming power supply adjusts the luminance of the LED lamp and has high universality. Moreover, each of lots of LED lamps has high consistency during adjusting its luminance.

10 Claims, 4 Drawing Sheets

LED CONSTANT-VOLTAGE DIMMING POWER SUPPLY AND DIMMING SYSTEM FOR LED LAMP HAVING SAME

RELATED APPLICATION

The present application claims benefit of the Chinese Application, CN201510358229.7, filed on Jun. 24, 2015.

BACKGROUND

1. Technical Field

The present application relates to lighting power supply devices, and more particularly to an LED constant-voltage dimming power supply and dimming system for LED lamp having same.

2. Description of the Related Art

Light emitting diode (LED) is growing in popularity due to decreasing costs and long life compared to incandescent lighting and fluorescent lighting. LED lighting can also be dimmed without impairing the useful life of the LED light source.

In the prior art, one of many methods of dimmer is adopted to change current loaded on an LED lamp so as to change output power of the LED lamp. However, the dimmer method of changing current is limited to only supply for resistance current-limiting LED load. When it is used to supply for an LED lamp which have built-in DC-DC driver or an LED lamp which is a linear current regulative, these LED lamp will twinkle. On the other hand, since circuit itself has resistance, if a lot of loads adopt the dimmer method of changing current, it will result in different luminance among the different loads as different loads have different current flowing thererinto. Therefore, the LED driver having the dimmer method of changing current will have low universality and low consistency.

Therefore, it is necessary to provide an LED constant-voltage dimming power supply and dimming system for LED lamp having same to solve the above problem.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The present application is illustrated by way of example and not by way of limitation in the figures of the accompanying drawings. It should be noted that references to "an" or "one" embodiment in this disclosure are not necessarily to the same embodiment, and such references mean at least one.

Figure 1:
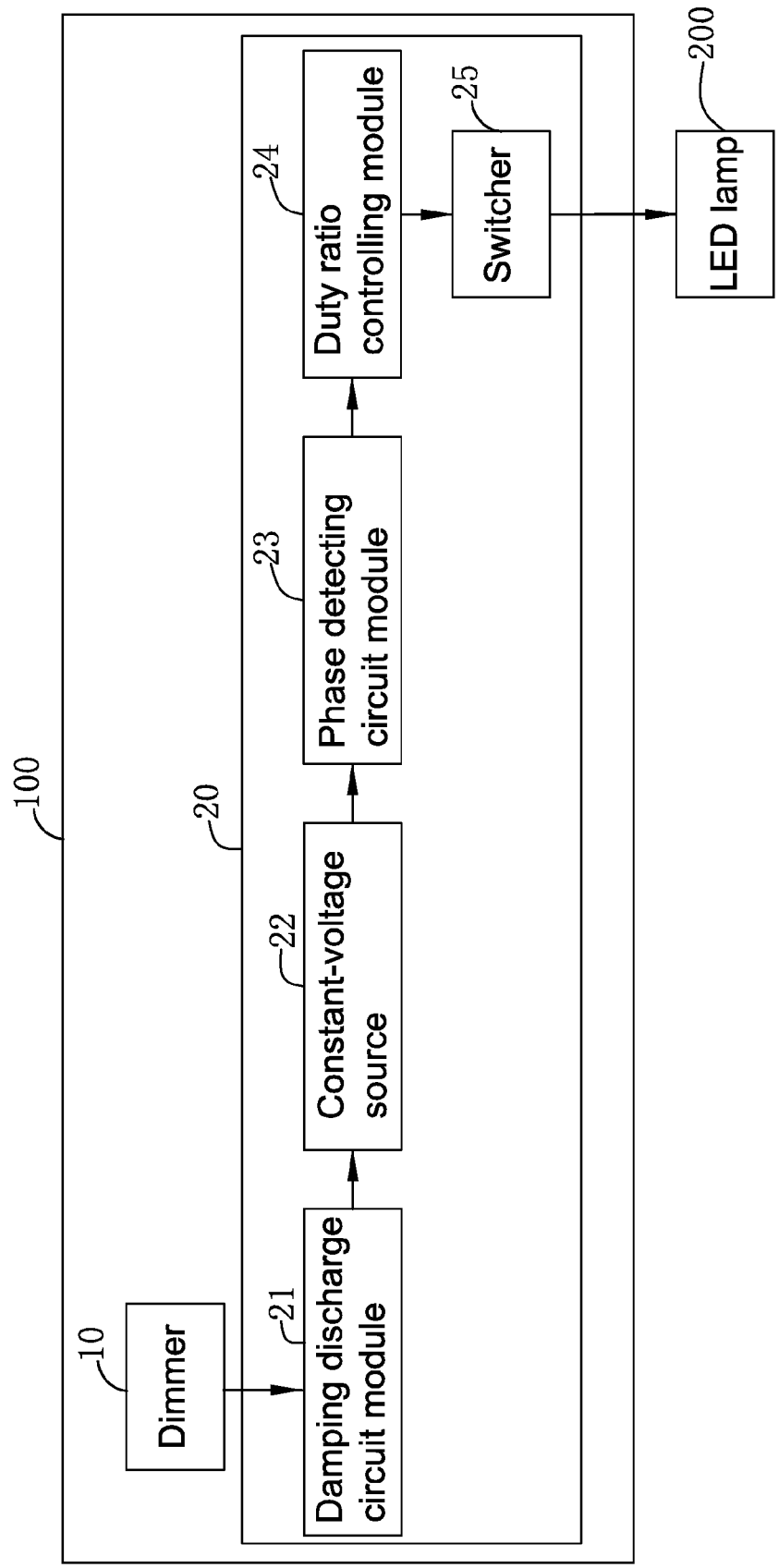
FIG. 1 is a block diagram of a dimmer system for an LED lamp according to a embodiment.

Referring to FIG. 1, a block diagram of a dimmer system 100 for an LED lamp is shown according to an embodiment. The dimmer system 100 for an LED lamp includes a dimmer 10, and an LED constant-voltage dimming power supply 20 electrically connected to the dimmer 10. The dimmer system 100 is used to change the luminance of the LED lamp 200. As well known for a person skilled in the art, it may be have a lots of LED lamp 200 in the dimmer system 100.

The dimmer 10 is configured for outputting dimmer-phase voltage signal and electrically connected to an external power source so as to dim the phase of the output voltage of the external power source. As well known for a person skilled in the art, the output voltage of the external power source may be from 0 volt to 10 volt, also may be AC mains. The dimmer 10 may be a leading edge dimmer or a trailing edge dimmer. In the present embodiment, the dimmer 10 is a TRIAC dimmer.

Figure 2:
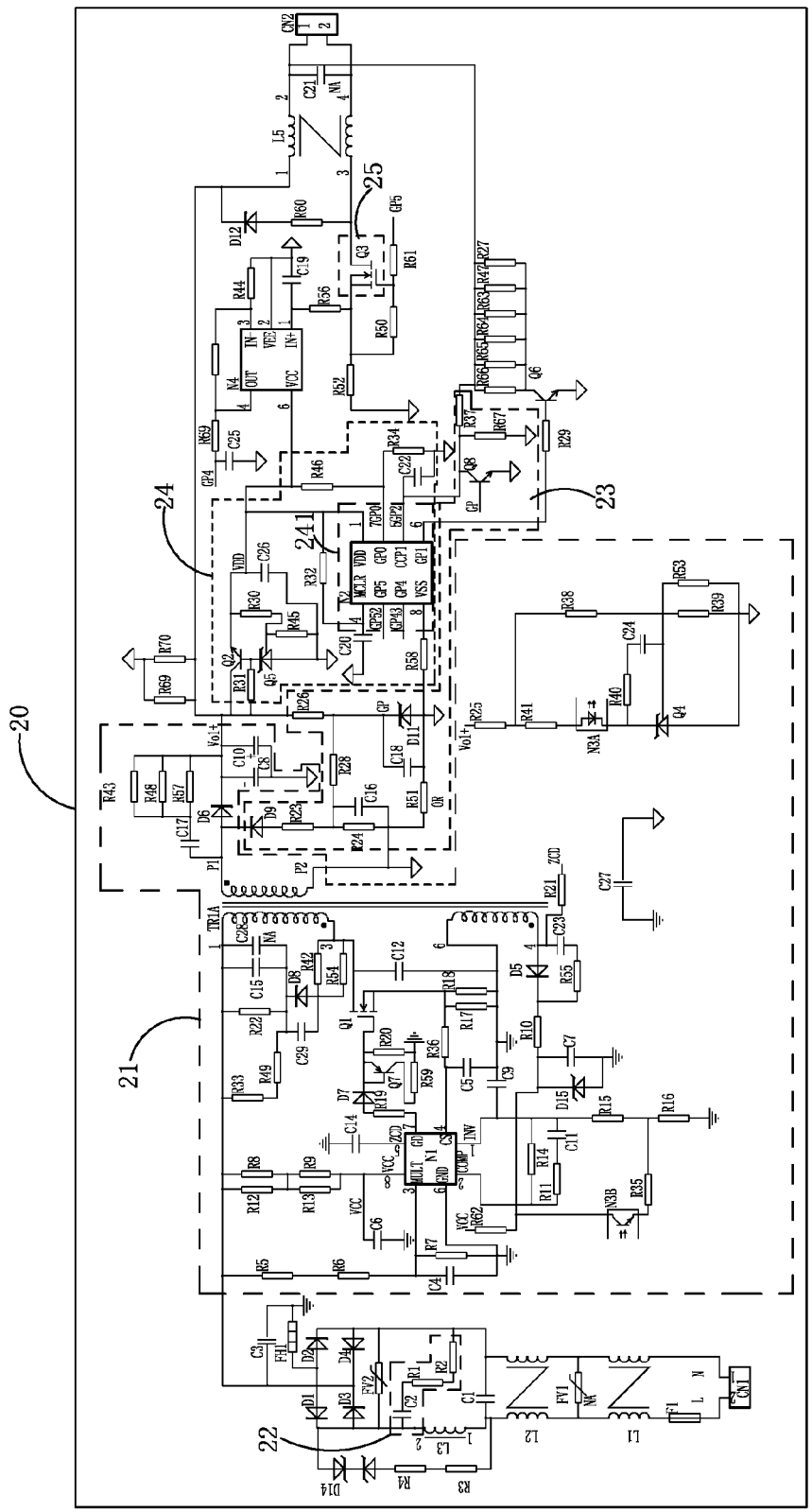
FIG. 2 is a circuit diagram of an LED constant-voltage dimming power supply of the dimmer system for an LED lamp of FIG. 1.

Referring to FIG. 2 together, the LED constant-voltage dimming power supply 20 is configured for changing duty ratio of output voltage in itself according to a controlling signal from the dimmer 10. The LED constant-voltage dimming power supply 20 includes a constant-voltage source 21, a damping discharge circuit module 22 electrically connected to an input end of the constant-voltage source 21, a phase detecting circuit module 23 electrically connected to an output end of the constant-voltage source 21, a duty ratio controlling module 24 coupled to the phase detecting circuit module 23, and a switcher 25 electrically connected to the duty ratio controlling module 24.

Need to further explain that the "couple to" indicates direct electrical connection or indirect electrical connection. The "input end" and "output end" indicate the preceding stage and backward stage of the constant-voltage source 21 or a primary circuit and a secondary circuit of a converter.

Referring to FIG. 2 together, the constant-voltage source 21 is configured for outputting a constant voltage. In the present embodiment, the constant-voltage source 21 is a single-stage flyback constant-voltage source. The constant-voltage source 21 can perform energy conversion by a converter therein. The constant-voltage source 21 may have one converter or two converters so as to perform two stages energy conversion. In the present embodiment, the constant-voltage source 21 includes one converter TR1A to perform energy conversion, a diode D6 configured for rectification, and two electrolytic capacitors C8, C10 configured for filter to obtain a constant voltage. The constant-voltage source 21 performs the energy conversion by the converter TR1A and two opposite phases are formed two sides of the converter TR1A. As shown in the circuit diagram of FIG. 2, a constant voltage is outputted at Vol+ point after it is rectified by the diode D6 and filtered by the two electrolytic capacitors C8, C10. Further, the constant-voltage source 21 includes other electronic elements which should be well known for a person in the art and aimed to obtain an appropriate constant voltage.

Referring to FIG. 2 again, the damping discharge circuit module 22 is configured for stabilizing a working current of the dimmer 10 when the dimmer 10 is turn on. The damping discharge circuit module 22 stabilizes the working current of the dimmer 10 when large fluctuation occurs in the working current of the dimmer 10, such as impulse current, current fall, and so on. The damping discharge circuit module 22 may include an integrated circuit chip to regulate the working current of the dimmer 10 so as that the dimmer 10 can work normally. In the present embodiment, the damping discharge circuit module 22 includes a first capacitor C2, and at least a first resistance R1 electrically connected to the first capacitor C2 in parallel. The first capacitor C2 charges when the circuit has the impulse current and discharges when current in the circuit downs. As a result, the working current of the dimmer 10 can be stabilized.

Figure 3:
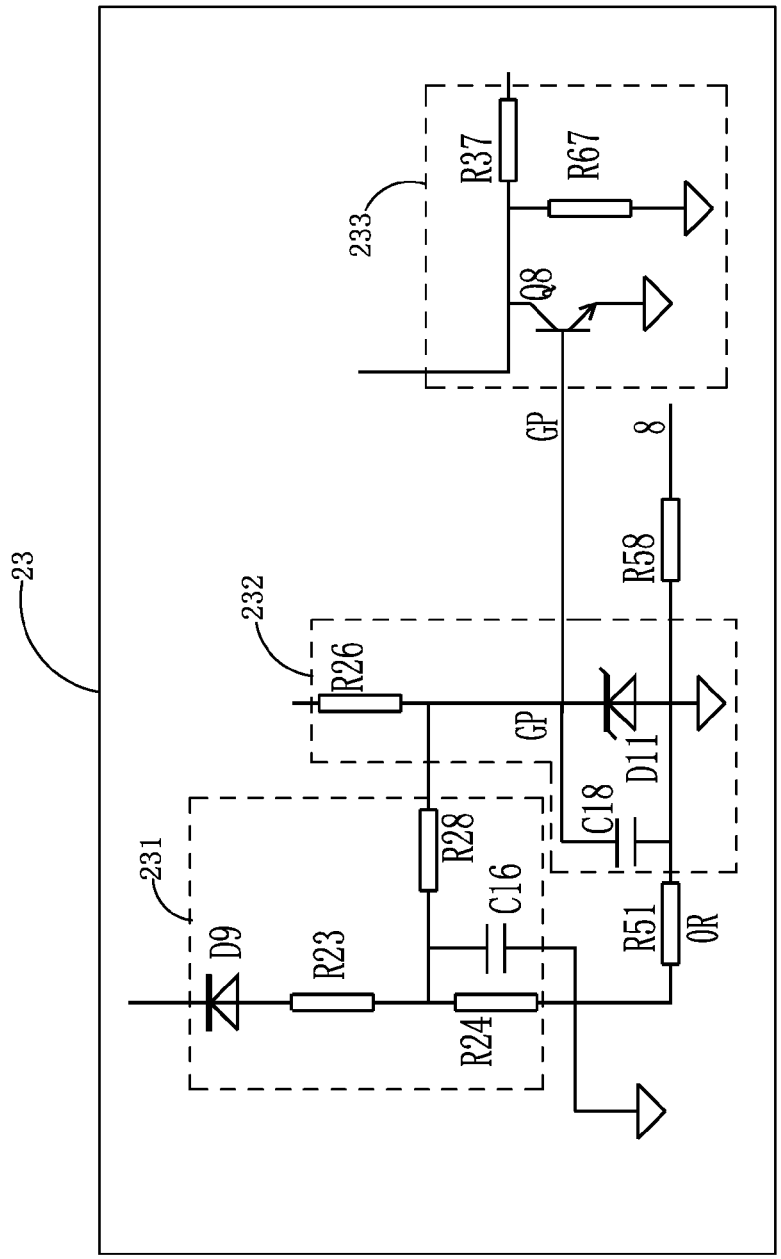
FIG. 3 is a circuit diagram of a phase detecting circuit module of the LED constant-voltage dimming power supply of FIG. 2.

Referring to FIG. 2 and FIG. 3 together, the phase detecting circuit module 23 is configured for taking sample of an output voltage of the constant-voltage source 21 and changing a voltage sample signal into a first duty ratio signal. In the present embodiment, the phase detecting circuit module 23 includes a filter unit 231, a bias voltage stabilizing unit 232 electrically connected to the filter unit 231, and a signal phase inverting unit 233 electrically connected to the bias voltage stabilizing unit 232. The filter unit 231 is configured to filter high-frequency signal so as to obtain a voltage whose cutting angle is same with that of output voltage of the dimmer 10. The bias voltage stabilizing unit 232 is configured to transform the input voltage signal into a square signal and output the square signal. The signal phase inverting unit 233 is configured to inverting the square signal into the first duty ratio signal. Further, the filter unit 231 includes a first current-limiting resistance R23, a second current-limiting resistance R24 electrically connected to the first current-limiting resistance R23, a first filter capacitor C16 electrically connected to the second current-limiting resistance R24, and a third current-limiting resistance R28. The bias voltage stabilizing unit 232 includes a biasing resistance R26, and a voltage-regulator tube D11 electrically connected to the biasing resistance R26. The voltage-regulator tube D11 is ground. In the present embodiment, the biasing resistance R26 is electrically connected to the third current-limiting resistance r28. Further, the voltage-regulator tube D11 is electrically connected to a second filter capacitor C18. The second filter capacitor 18 is used to further filter. The signal phase inverting unit 233 is configured to output the first duty ratio signal and is electrically connected to the duty ratio controlling module 24. The signal phase inverting unit 233 includes a triode Q8, a first divider resistance R67 electrically connected to the triode Q8, and a second divider resistance R37 electrically connected to the triode Q8. A base of the triode Q8 is electrically connected to the bias voltage stabilizing unit 232. A collect of the triode Q8 is electrically connected to the first divider resistance R67 and is ground.

Referring to FIG. 2 again, the duty ratio controlling module 24 is configured for changing the first duty ratio signal into a second duty ratio signal. The second duty ratio signal is applied to control the switcher 25. As the different switcher 25 has different parameters, the driver voltage of the different switcher 25 has difference. Because the first duty ratio signal may be a weak signal, it firstly needs to be amplified into the second duty ratio signal to drive the switcher 25. In order to simplify the whole circuit, the duty ratio controlling module 24 includes a single chip microcomputer 241 in the present embodiment. Understandably, the duty ratio controlling module 24 further includes some peripheral circuit to aid the single chip microcomputer 241 to normally work. According to different duty ratio signal, the duty ratio controlling module 24 may adopt some electronic elements, such as resistances, capacitors, inductance, and so on to form a corresponding circuit to transform the first duty ratio signal into the second duty ratio signal. As well known, the parameters, such as duty ratio, frequency, and so on, of the second duty ratio signal can be adjusted according to desired lighting effects. For example, the first duty ratio signal may have a frequency of 25 Hz, and the second duty ratio signal has 100 Hz, 200 Hz, or 400 Hz.

Referring to FIG. 2 again, the switcher 25 is configured for adjusting a duty ratio of an outputted constant voltage of the LED constant-voltage dimming power supply 20 so as to adjust output power thereof according to the second duty ratio signal. The switcher 25 may be a N-typed MOS in the present embodiment. Understandably, the switcher 25 can adopt other electronic components, such as triode or P-typed MOS, and merely, the whole circuit needs to be modified correspondingly.

Figure 4:
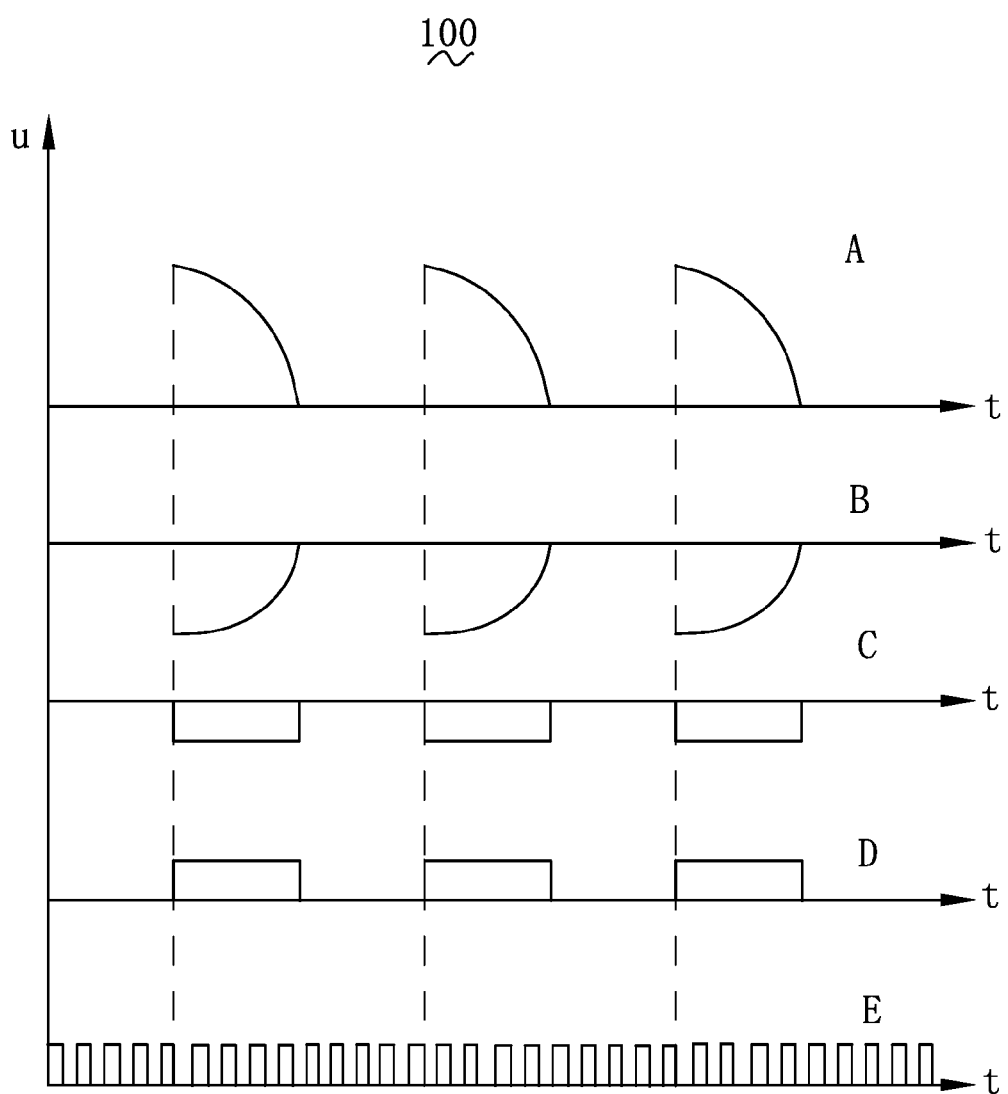
FIG. 4 is an oscillogram of voltage signal of the LED constant-voltage dimming power supply of FIG. 2.

Referring to FIG. 4, the work principle of the dimmer system 100 for the LED lamp is explained. After the LED constant-voltage dimming power supply 20 receives the cutting-phase voltage signal (as shown by A in FIG. 4), the constant-voltage source 21 process the energy conversion according to the voltage signal. The constant-voltage source 21 inverts the phase of the voltage signal and transforms the voltage amplitude according to turn ratio of the converter. The filter unit 231 of the phase detecting circuit module 23 filters the high-frequency signal of the voltage signal from the constant-voltage source 21 and obtain a new voltage signal as shown by B in FIG. 4. The bias voltage stabilizing unit 232 biases the new voltage signal shown by B of FIG. 5 into a forward voltage signal and further stabilizes the forward voltage signal so as to obtain a voltage signal as shown by C in FIG. 4. The triode Q8 of the signal phase inverting unit 233 turns on and is ground and then outputs low level signal when it receives a high level signal. On the contrary, the triode Q8 of the signal phase inverting unit 233 turns off when it receives a low level signal and outputs high level signal under the dividing voltage work of the first divider resistance R37 and the second divider resistance R67 so as to obtain the first duty ratio signal as shown by D in FIG. 4. The duty ratio controlling module 24 changes the first duty ratio signal into the second duty ratio signal as shown by E in FIG. 4. The second duty ratio signal is applied to control the switcher 25.

As above described, the LED constant-voltage dimming power supply 20 adjusts the luminance of the LED lamp by adjusting the duty ratio of outputted constant-voltage and not by limiting current therethrough. Therefore, the LED constant-voltage dimming power supply 20 is suitable for various and different LED lamps and has high universality. Moreover, voltage loaded on each of lots of LED lamps and provided by the LED constant-voltage dimming power supply 20 has no diversity as the LED lamps is increased or decreased. Therefore, each of lots of LED lamps has high consistency during adjusting its luminance.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An LED constant-voltage dimming power supply being electrically connected to a dimmer and configured for changing duty ratio of output voltage thereof according to a controlling signal from the dimmer, comprising:
   a constant-voltage source being configured for outputting a constant voltage;
   a damping discharge circuit module electrically connected to an input end of the constant-voltage source, the damping discharge circuit module being configured for stabilizing a working current of the dimmer when the dimmer is turn on;

a phase detecting circuit module electrically connected to an output end of the constant-voltage source, the phase detecting circuit module being configured for taking a sample of an output voltage of the constant-voltage source and changing a voltage sample signal into a first duty ratio signal;

a duty ratio controlling module coupled to the phase detecting circuit, the duty ratio controlling module being configured for changing the first duty ratio signal into a second duty ratio signal; and a switcher electrically connected to the duty ratio controlling module, the second duty ratio signal being applied to control the switcher, the switcher being configured for adjusting a duty ratio of an outputted constant voltage of the LED constant-voltage dimming power supply so as to adjust output power thereof according to the second duty ratio signal.

2. The LED constant-voltage dimming power supply as claimed in claim 1, wherein the constant-voltage source is a single-stage flyback constant-voltage source.

3. The LED constant-voltage dimming power supply as claimed in claim 1, wherein the damping discharge circuit module comprises a first capacitance and a first resistance electrically connecting to the first capacitance in parallel.

4. The LED constant-voltage dimming power supply as claimed in claim 1, wherein the phase detecting circuit module comprises a first diode, an anode end the first diode is electrically connected to the output end of the constant-voltage source, a cathode of the first diode is electrically connected to a second resister.

5. The LED constant-voltage dimming power supply as claimed in claim 1, wherein the phase detecting circuit module comprises a filter unit, a bias voltage stabilizing unit electrically connected to the filter unit, and a signal phase inverting unit electrically connected to the bias voltage stabilizing unit, the bias voltage stabilizing unit is configured for transforming the inputted voltage signal into a square signal and outputting the square signal, the signal phase inverting unit is configured for inverting the square signal into the first duty ratio signal.

6. The LED constant-voltage dimming power supply as claimed in claim 5, wherein the filter unit comprises a first current-limiting resistance, a second current-limiting resistance electrically connected to the first current-limiting resistance, a first filter capacitor electrically connected to the second current-limiting resistance in parallel, and a third current-limiting resistance electrically connected to the first current-limiting resistance.

7. The LED constant-voltage dimming power supply as claimed in claim 5, wherein the bias voltage stabilizing unit comprises a biasing resistance, and a voltage-regulator tube electrically connected to the biasing resistance, the voltage-regulator tube is ground.

8. The LED constant-voltage dimming power supply as claimed in claim 5, wherein the signal phase inverting unit comprises a triode, a first divider resistance electrically connected to the triode, and a second divider resistance electrically connected to the triode, a base of the triode is electrically connected to the bias voltage stabilizing unit, a collector of the triode is electrically connected to the first divider resistance and grand, the collect of the triode is electrically connected to the second divider resistance.

9. A dimming system for an LED lamp, comprising:

a dimmer, the dimmer being configured for outputting dimmer-phase voltage signal, an LED constant-voltage dimming power supply being electrically connected to a dimmer and configured for changing duty ratio of output voltage thereof according to a controlling signal from the dimmer, comprising:

a constant-voltage source being configured for outputting a constant voltage;

a damping discharge circuit module electrically connected to an input end of the constant-voltage source, the damping discharge circuit module being configured for stabilizing a working current of the dimmer when the dimmer is turn on;

a phase detecting circuit module electrically connected to an output end of the constant-voltage source, the phase detecting circuit module being configured for taking sample of an output voltage of the constant-voltage source and changing a voltage sample signal into a first duty ratio signal;

a duty ratio controlling module coupled to the phase detecting circuit, the duty ratio controlling module being configured for changing the first duty ratio signal into a second duty ratio signal; and a switcher electrically connected to the duty ratio controlling module, the second duty ratio signal being applied to control the switcher, the switcher being configured for adjusting a duty ratio of an outputted constant voltage of the LED constant-voltage dimming power supply so as to adjust output power thereof according to the second duty ratio signal.

10. The dimming system for an LED lamp as claimed in claim 9, wherein the dimmer is a TRIAC dimmer.

* * * * *